(12) United States Patent
Johnson

(10) Patent No.: US 7,449,807 B2
(45) Date of Patent: Nov. 11, 2008

(54) MAGNETIC TRANSMISSION

(75) Inventor: Neldon P. Johnson, Salem, UT (US)

(73) Assignee: N.P. Johnson Family Limited Partnership, Salem, UT (US)

( * ) Notice: Subject to any disclaimer, the term of this patent is extended or adjusted under 35 U.S.C. 154(b) by 500 days.

(21) Appl. No.: 11/351,738

(22) Filed: Feb. 9, 2006

(65) Prior Publication Data
US 2007/0182262 A1    Aug. 9, 2007

(51) Int. Cl.
*H02K 7/06* (2006.01)
(52) U.S. Cl. ............... 310/103; 310/80; 74/490.09; 464/29
(58) Field of Classification Search ............ 310/103, 310/104, 105, 78, 92; 464/29; 74/490.09
See application file for complete search history.

(56) References Cited

U.S. PATENT DOCUMENTS

| | | | | |
|---|---|---|---|---|
| 3,700,941 A * | 10/1972 | Duncan | ............. | 310/105 |
| 3,864,587 A | 2/1975 | Landry | ............. | 310/103 |
| 3,895,245 A | 7/1975 | Bode | ............. | 310/46 |
| 4,100,441 A | 7/1978 | Landry | ............. | 310/103 |
| 4,179,633 A | 12/1979 | Kelly | ............. | 310/80 |
| 4,186,320 A * | 1/1980 | Hillman | ............. | 310/93 |
| 4,196,639 A | 4/1980 | Spodig | ............. | 74/210 |
| 4,309,620 A * | 1/1982 | Bock | ............. | 290/4 R |
| 4,327,301 A * | 4/1982 | Janson | ............. | 310/104 |
| 4,363,999 A * | 12/1982 | Preikschat | ............. | 318/53 |
| 4,593,218 A | 6/1986 | Streeter | ............. | 310/103 |
| 4,645,432 A | 2/1987 | Tata | ............. | 417/420 |
| 4,725,197 A | 2/1988 | Russell et al. | ............. | 415/104 |
| 4,734,621 A | 3/1988 | Yonnet et al. | ............. | 315/111.41 |
| 4,808,869 A | 2/1989 | Kopp | ............. | 310/78 |
| 4,850,821 A | 7/1989 | Sakai | ............. | 417/420 |
| 5,013,949 A | 5/1991 | Mabe, Jr. | ............. | 310/83 |
| 5,569,967 A | 10/1996 | Rode | ............. | 310/103 |
| 5,717,266 A | 2/1998 | Maynard | ............. | 310/103 |
| 6,095,223 A | 8/2000 | Rossini et al. | ............. | 160/107 |
| 6,176,355 B1 * | 1/2001 | Yamamoto | ............. | 188/267 |
| 6,263,664 B1 | 7/2001 | Tanigawa et al. | ............. | 60/39.54 |
| 6,338,681 B1 | 1/2002 | Lin | ............. | 464/29 |
| 6,713,933 B2 | 3/2004 | Martin | ............. | 310/254 |
| 6,948,597 B2 * | 9/2005 | Kuwahara | ............. | 188/164 |
| 6,959,778 B2 * | 11/2005 | Wood et al. | ............. | 180/248 |
| 7,057,321 B2 * | 6/2006 | Kuwahara | ............. | 310/105 |
| 2003/0227227 A1 * | 12/2003 | Tu et al. | ............. | 310/92 |
| 2004/0178689 A1 * | 9/2004 | Song | ............. | 310/103 |
| 2007/0182262 A1 * | 8/2007 | Johnson | ............. | 310/103 |

* cited by examiner

*Primary Examiner*—James Harvey
(74) *Attorney, Agent, or Firm*—J. David Nelson

(57) ABSTRACT

A magnetic transmission having an input shaft and an output shaft with two or more gear assemblies, each gear assembly having an input sprocket affixed to the input shaft, an output armature with peripheral electromagnets affixed to the output shaft, a transfer drum concentric with the output armature and having electromagnets inset from the inside surface of the transfer drum and a drum sprocket on the periphery of the transfer drum, and a transfer chain engaging the input sprocket and the drum sprocket. A gear assembly actuator is used to select and energize a desired gear assembly. A hysteresis clutch can also be used in lieu of the output armature and the transfer drum.

41 Claims, 8 Drawing Sheets

MAGNETIC TRANSMISSION

BACKGROUND OF THE INVENTION

This invention is in the field of magnetic transmissions and in particular in the field of magnetic transmissions providing for multiple speed energy transmission.

The transmission of energy from an energy source such as an automobile engine, electric motor or turbine to an energy consuming apparatus, such as an automobile drive train, machine or an electric generator requires a transmission for the adjustment or control of the revolution speed of the application. Traditional transmissions utilize meshing gears and belts for the transfer of energy at a desired rate of rotation. These mechanisms have inherent durability, maintenance and efficiency limitations.

Magnetic transmissions of various designs to address the physical, operational, maintenance, and efficiency limitations of conventional and mechanical gear transmissions. Notable among these are the magnetic transmission disclosed in U.S. Pat. Nos. 3,864,587 and 4,100,441 to Landry, U.S. Pat. No. 5,013,949 to Mabe, U.S. Pat. No. 5,569,967 to Rode, U.S. Pat. No. 6,263,664 to Tanigawa and U.S. Pat. No. 6,338,681 to Lin.

SUMMARY OF THE INVENTION

An input shaft receives rotational energy from an energy source such as an automobile engine or an electric motor. The input shaft for a preferred embodiment has a plurality of input sprockets which extend radially from the input shaft. An inboard input bearing and an outboard input bearing provide stability for the input shaft and provide for it to be anchored to a transmission support or to a transmission housing in the case of an automobile transmission. An output shaft, which is likewise secured to the transmission support or transmission housing, is stabilized by an inboard output bearing and an outboard output bearing.

The transmission has a plurality of output armatures, one for each speed or 'gear ratio' desired. Each output armature is rigidly affixed to the output shaft. Each output armature has a plurality of magnetic insets. The magnetic insets each have an output armature magnet which can be permanent magnets or electromagnets. The inventor prefers a solid armature construction with the armatures having a core constructed of a soft ferromagnetic material. The magnetic insets preferably have an inset insulation barrier which electrically insulates the output armature magnets, whether they be permanent magnets or electromagnets, from the armature core material. Generally the magnetic insets and the output armature magnets contained therein will extend from the inboard end to the outboard end of the output armature. For automobile or other high torque applications, electromagnets will typically be required for the output armature magnets due to size limitations.

For a preferred embodiment, a respective transfer drum, is positioned concentrically to the output armature periphery of each output armature, the transfer drum inside surface being separated from the output armature periphery by an armature clearance. The transfer drum has a plurality of magnetic elements, each magnetic element containing an output transfer magnet. The magnetic element angular spacing is equal to the magnetic inset angular spacing of the corresponding output armature for this embodiment. The magnetic element width is roughly equal to the magnetic inset width. Further, the magnetic element length is roughly equal to magnetic inset length. The length and width of the output armature magnets of an output armature is therefore roughly equal to the length and width of the output transfer magnets of the corresponding transfer drum.

The magnetic insets and the magnetic elements are preferably longitudinal with the length dimension of each paralleling the output axis. This embodiment provides for the most effective magnetic lock between the output armature and the corresponding transfer drum when they are activated. Other embodiments may provide for other shapes of magnetic insets and magnetic elements, such as spirals or v-shape.

As with the output armature magnets, the output transfer magnets can be permanent magnets or electromagnets. However, since the magnetic fields of the output armature magnets and the output transfer magnets must be oriented for attraction when they are each activated, and since the user must be able to engage and disengage the attraction, both the output armature magnets and the output transfer magnets can not be permanent magnets. The present inventor prefers electromagnets for the output armature magnets and the output transfer magnets, since this provides for complete deactivation of the magnetic fields of the output armature magnets and the output transfer magnets when the de-energization of the output armature is desired, and provides for the utilization of stronger magnetic fields and therefore stronger forces of attraction between the output armature magnets and the output transfer magnets.

Each transfer drum has a drum sprocket which is generally of circular shape, projects radially with respect to the output shaft, and is rigidly attached to the transfer drum periphery. A transfer belt, which can comprise and is defined for all purposes herein to mean a chain or belt of various designs and construction which will be known to persons skilled in the art, engages the input sprocket and the drum sprocket, providing for the transfer of rotational energy from the input shaft to the transfer drum. The term "sprocket", as used in term "input sprocket", "drum sprocket", and "transfer belt sprocket", is defined herein to mean and include appropriate belt engagement means for the type of transfer belt utilized. For a transfer belt comprising a chain, the input sprocket and the drum sprocket shall be chain sprockets. By the simultaneous activation of the output transfer magnets and the output armature magnets, the rotational energy from the input shaft is transferred to the output shaft.

The inboard end and outboard end respectively of the transfer drum may be connected to a transfer drum end wall which is rotatably attached to the output shaft by a transfer drum bearing. The bearings provide for the free rotation of the transfer drum. If the transfer drum end walls are to be used to provide power to the output transfer magnets, a transfer bearing insulator can be used to electrically insulate the end walls from the output shaft.

A preferred embodiment of the magnetic transmission of the present invention includes an electronic gear assembly actuator for the selection and actuation of a desired gear assembly. The gear assembly with the desired speed or gear ratio is selected manually by the user or is selected automatically, the output armature magnets and the output transfer magnets for the selected gear assembly are activated, and any previously activated gear assembly is deactivated. The electronic actuator, by ramping up the electrification of a selected gear assembly and ramping down the electrification of a deselected gear assembly, can also provide for spin up of the selected gear or speed and spin down of the de-selected speed or gear, thereby providing for smooth shifting.

An alternative embodiment of the gear assembly for each gear can include an input armature having a plurality of input magnetic insets such as that provided for the output armature.

Each input magnetic inset has an input armature magnet, which can be a permanent magnet or an electromagnet, as discussed for the output armature magnets. The magnetic elements for this embodiment are incorporated into the transfer belt, and extend from the armature inboard end to the armature outboard end. The transfer magnets are affixed in the transfer belt magnetic elements in a manner similar to that for the transfer drum magnetic elements. The magnetic elements of the transfer belt are rotatably connected by pivot pins which allows the radial rotation of the magnetic elements of the transfer belt so that they can be positioned a uniform belt spacing from the output armature periphery as they move from an disengaged position to an engaged position proximal to the output armature and as they move from a disengaged position to an engaged position proximal to the input armature. An inboard transfer belt sprocket and an outboard transfer belt sprocket are each rotatably affixed to the output shaft by an output sprocket bearing. These bearings position the sprockets longitudinally and prevent longitudinal movement of the sprockets while allowing the sprockets to rotate freely on the output shaft. The pivot pins are preferably extended to provide for them to engage the inboard transfer belt sprocket and the outboard transfer belt sprocket, these sprockets providing for maintaining uniform belt spacing when the magnetic elements are in an engaged position and allow separation of the magnetic elements from the output armature as the magnetic elements move to a disengaged position. Similarly an inboard input sprocket and an outboard input sprocket provide for maintaining uniform belt spacing for the input armature. Each of these sprockets is connected to the input shaft by an input sprocket bearing which positions the sprocket longitudinally and prevents longitudinal movement of the sprocket while allowing the sprocket to rotate freely on the input shaft.

A further alternative embodiment of the gear assembly incorporates an inboard input sprocket and an outboard input sprocket which are rigidly attached to the input shaft, thereby eliminating the need for the input armatures. For that embodiment, the transfer belt is magnetically engaged only to the output armature when the gear assembly is selected and activated. When the gear assembly is not activated the transfer belt runs continually with the input shaft with no energy transfer to the output armature occurring. The inboard transfer belt sprocket, the outboard transfer belt sprocket, the inboard input sprocket and the outboard input sprocket are separated from the respective armature by an armature sprocket spacing.

The input armature magnets, the output armature magnets, and the transfer belt magnets are activated for a selected gear for the input armature magnets, the output armature magnets, and the transfer belt magnets that are in an engaged position for the selected gear. Activation of a selected gear magnetically locks the transfer belt to the input armature and the output armature and deactivation results in the free rotation of the transfer belt, independent of the output armature and the input armature.

For the embodiments which incorporate the magnetic elements into the transfer belt, the magnetic elements must be disengaged from the armature, which is facilitated by de-energizing electromagnetic transfer magnets of the magnetic elements and requires the flexing of the transfer belt as the magnetic element moves between a transfer belt radial configuration and a transfer belt straight configuration. A preferred activation means for a selected gear assembly incorporates a pair of input brushes and a pair of output brushes which contact the outside ends of the pivot pins for the magnetic elements that are in an engaged position and do not contact the pivot pins of the magnetic elements in a disengaged position. The electromagnetic transfer magnets of each magnetic element must be energized as the magnetic element reaches an engagement position as it approaches the output armature and must be de-energized at the time of or prior to the magnetic element reaching the disengagement position before it begins to diverge from the output armature. The brushes remain in contact with power points for each magnetic element while the magnetic element remains in the engagement zone between the engagement position and the disengagement position. Of course the brush for the armature in question, is not energized and does not provide power to any of the transfer magnets of the transfer belt except when the gear assembly has been selected and activated.

An alternative activation means may utilize the inboard and outboard sprockets to provide power respectively to the input armature magnets, the input transfer magnets, the output armature magnets and the output transfer magnets. For these alternatives, bearings can be used to electrically isolate and energize the sprockets, thereby energizing the magnetic elements for which the pivot pins are in contact with the sprockets and de-energizing the magnetic elements as they are separated from the sprockets.

The magnetic elements can be energized and de-energized in a controlled sequence, to promote smoothness of changing gears or speeds. The power to the transfer magnets of some or all of the engaged magnetic elements can be ramped up and ramped down in order to provide a more smooth change of speeds or gears. To provide for smoothness of shifting gears, the transfer magnets of the selected gear assembly can be energized or ramped up over a selected time period, while the de-selected gear assembly is de-energized or ramped down over a selected time period. Other shifting control means will be known to persons skilled in the art for providing a more smooth change of speeds or gears.

Another alternative preferred embodiment of a gear assembly uses a hysteresis clutch. The hysteresis clutch can be alternatively energized or de-energized. A clutch sprocket, which extends around the exterior perimeter of the case assembly, engages the transfer belt which is also engaged by an input sprocket. The rotor is fixed to the output shaft while the case assembly rotates freely on the output shaft. The size of the hysteresis clutch can be selected to obtain the desired gear ratio. When the clutch is de-energized, the rotor spins freely in the case assembly and no energy is transmitted from the input shaft to the output shaft. When the clutch is energized, rotational energy from the input shaft in transferred to the output shaft.

Various embodiments of transfer belts, which, as noted above, are defined for purposes herein to include various embodiments of belts and chains known to persons skilled in the art, can be used to transfer energy from the input shaft to the output shaft. Also various embodiments of input transfer belt engagement means known to persons skilled in the art, such as a sprocket, can be used to transfer energy from an input shaft, an input transfer drum, or an input hysteresis clutch. Likewise, various embodiments of output transfer belt engagement means known to persons skilled in the art, such as a sprocket, can be used to transfer energy from a transfer belt to a transfer drum, an output armature, or an output hysteresis clutch and thereby transfer energy to the output shaft.

DETAILED DESCRIPTION

Figure 1:
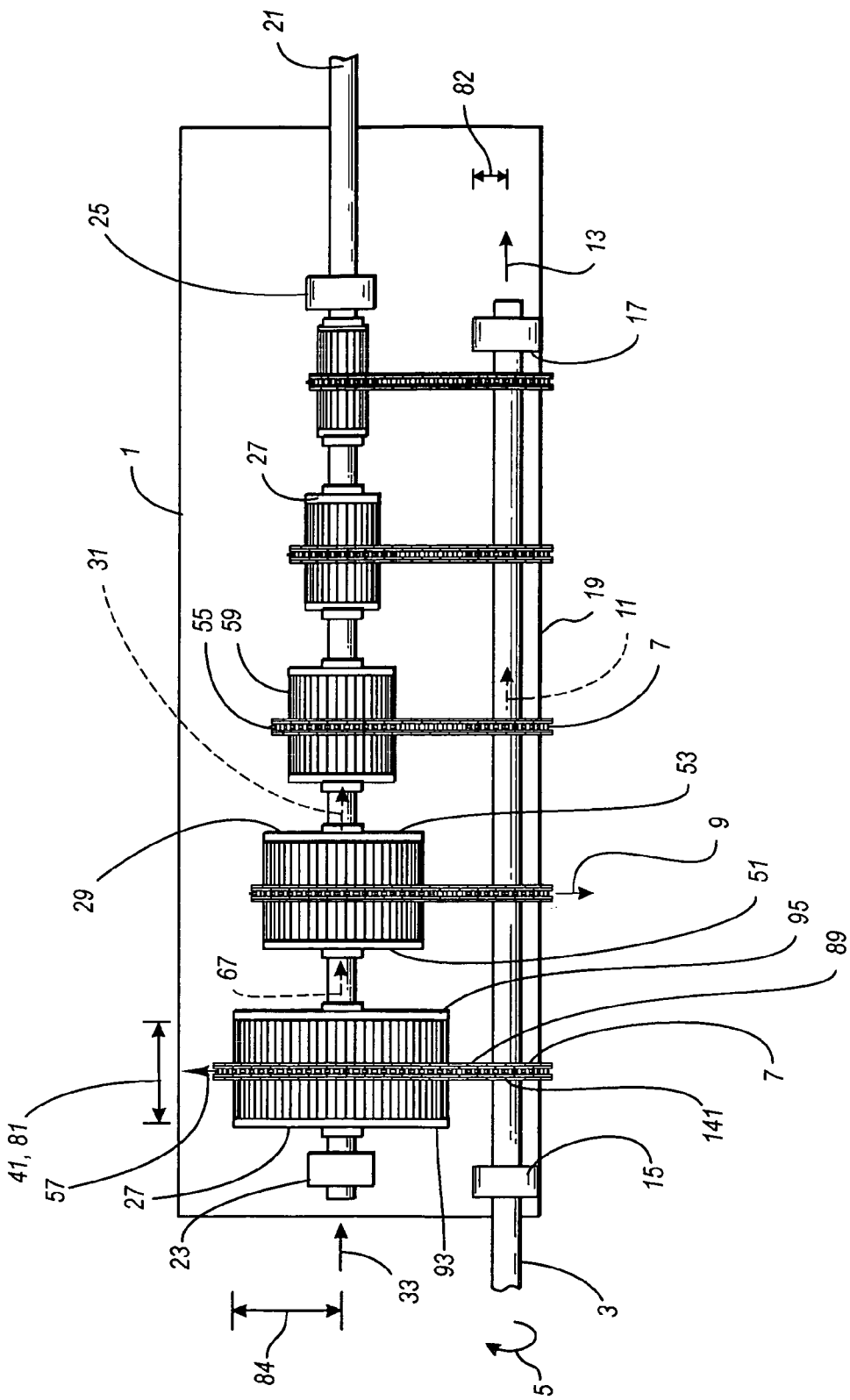
FIG. 1 is a plan view of a preferred embodiment of a magnetic transmission of the present invention with five gear assemblies.

Referring now to FIG. 1 a preferred embodiment the magnetic transmission 1 of the present invention is shown. For simplicity of illustration, the transmission illustrated for this embodiment is a five speed transmission. However, this embodiment could be readily adapted for any speed application of less or more than five speeds. For this embodiment an input shaft 3 receives rotational energy 5 from an energy source such as an automobile engine or an electric motor. The input shaft for this embodiment has five input sprockets 7 which extend radially 9 from the input shaft, the input sprockets being generally circular in shape and having a sprocket axis 11 which is aligned with the input shaft axis 13. An inboard input bearing 15 and an outboard input bearing 17 provide stability for the input shaft and provide for it to be anchored to a transmission support or to a transmission housing 19 in the case of an automobile transmission.

An output shaft 21, which is likewise secured to the transmission support or transmission housing, is stabilized by an inboard output bearing 23 and an outboard output bearing 25. For the embodiment shown in FIG. 1, the transmission has five output armatures 27, one for each speed or 'gear ratio' desired. Each output armature will preferably be cylindrically shaped 29 and will have an output armature axis 31 which is aligned with the output shaft axis 33. Each output armature is rigidly affixed to the output shaft.

Figure 2:
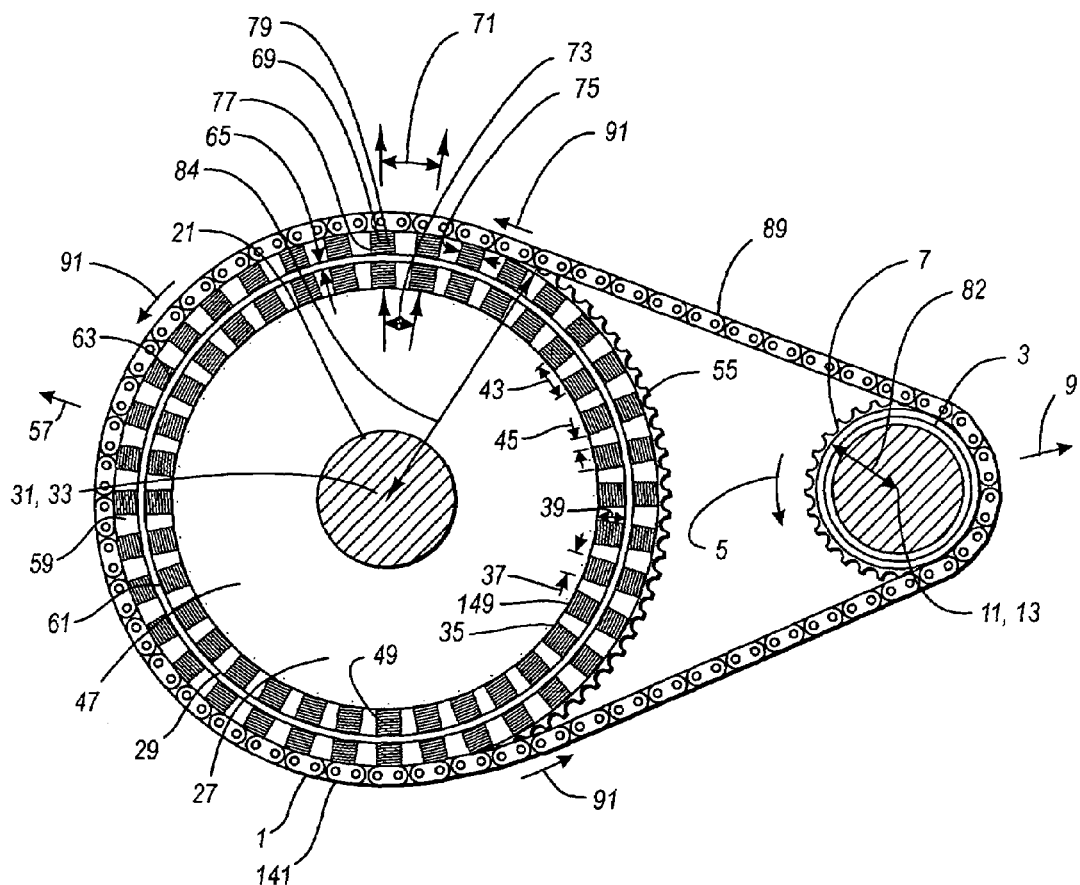
FIG. 2 is an end view cross section of a preferred embodiment of a gear assembly of the magnetic transmission of the present invention utilizing a transfer drum.

Referring also to FIG. 2, a cross section of a preferred embodiment of a gear assembly 141 for the embodiment of the magnetic transmission of FIG. 1, is shown. For this embodiment of the gear assembly, each output armature has a plurality of magnetic insets 35 with a uniform inset width 37, uniform inset depth 39, uniform inset length 41, and uniform construction. They are also spaced by a uniform inset spacing 43 which provides for a uniform inset separation 45. The magnetic insets each have an output armature magnet 149 which can be permanent magnets or electromagnets.

The inventor prefers a solid armature construction with the armatures having a core 47 constructed of a soft ferromagnetic material. The magnetic insets preferably have an inset insulation barrier 49 which electrically insulates the output armature magnets, whether they be permanent magnets or electromagnets, from the armature core material. Generally the magnetic insets and the output armature magnets contained therein will extend from the inboard end 51 to the outboard end 53 of the output armature. For automobile or other high torque applications, electromagnets will typically be required for the output armature magnets due to size limitations. Other designs, constructions and materials for the armatures will be known to persons skilled in the art.

For the embodiment shown in FIG. 1 and FIG. 2, a respective transfer drum 59, is positioned concentrically to the output armature periphery 61 of each output armature, the transfer drum inside surface 63 being separated from the output armature periphery by an armature clearance 65. The transfer drum has a drum axis 67 which is aligned with the output shaft axis 33 and the output armature axis 31. The transfer drum has a plurality of magnetic elements 69, each magnetic element containing an output transfer magnet 79. The magnetic element angular spacing 71 is equal to the magnetic inset angular spacing 73 of the corresponding output armature for this embodiment. The magnetic element width 75 is roughly equal to the magnetic inset width 37. Further, the magnetic element length 81 is roughly equal to magnetic inset length 41. The length and width of the output armature magnets of an output armature is therefore roughly equal to the length and width of the output transfer magnets of the corresponding transfer drum.

For the embodiment shown in FIG. 1 and FIG. 2, the magnetic insets and the magnetic elements are longitudinal with the length dimension of each paralleling the output axis. This embodiment provides for the most effective magnetic lock between the output armature and the corresponding transfer drum when they are activated. Other embodiments may provide for other shapes of magnetic insets and magnetic elements, such as spirals or v-shape. However, depending on the extent of the departure of such embodiments from the longitudinal, i.e. the extent to which the magnetic insets and magnetic elements are circumferential rather than longitudinal, they are likely to increase the tendency for slippage between the output armature and the corresponding transfer drum when they are activated. The term "generally longitudinal" when applied to the magnetic insets, magnetic elements, armature magnets, and transfer magnets, shall be defined herein to mean more longitudinal than circumferential.

While for the embodiment shown in FIG. 1, the input sprockets all have the same input sprocket radius 82, the radius of the respective input sprockets can be varied as needed to achieve the desired gear ratio for a given output sprocket radius 84.

As with the output armature magnets, the output transfer magnets can be permanent magnets or electromagnets. However, since the magnetic fields of the output armature magnets and the output transfer magnets must be oriented for attraction when they are each activated, and since the user must be able to engage and disengage the attraction, both the output armature magnets and the output transfer magnets can not be permanent magnets. The present inventor prefers electromagnets for the output armature magnets and the output transfer magnets, since this provides for complete deactivation of the magnetic fields of the output armature magnets and the output transfer magnets when the de-energization of the output armature is desired, and provides for the utilization of stronger magnetic fields and therefore stronger forces of attraction between the output armature magnets and the output transfer magnets.

Figure 3:
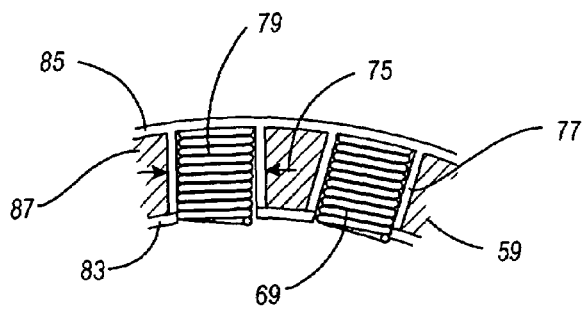
FIG. 3 is a cross section detail of a preferred embodiment of a transfer drum.

Referring also to FIG. 3, as with the magnetic insets, the magnetic elements have an element insulation barrier 77, providing for insulating the output transfer magnets. The inventor prefers a drum frame 83 constructed of steel and a hull 85 constructed of steel for the transfer drum. The use of other materials for the drum frame and the hull will be known to persons skilled in the art. The inventor also prefers a matrix 87 of soft ferromagnetic filler in the transfer drum between the output transfer magnets to help confine the magnetic field of the output transfer magnets. However, other embodiments of the transfer drum may consist merely of a drum frame and the magnetic elements containing the output transfer magnets.

For the embodiment shown, each transfer drum has a drum sprocket 55 which is generally of circular shape, projects radially 57 with respect to the output shaft, and is rigidly attached to the transfer drum periphery 58. A transfer belt 89, which can comprise and is defined for all purposes herein to mean a chain or belt of various designs and construction which will be known to persons skilled in the art, engages the input sprocket 7 and the drum sprocket 55, providing for the transfer of rotational energy from the input shaft to the transfer drum. The term "sprocket", as used in term "input sprocket", "drum sprocket", and "transfer belt sprocket", is defined herein to mean and include appropriate belt engagement means for the type of transfer belt utilized. For a transfer belt comprising a chain, the input sprocket and the drum sprocket shall be chain sprockets. By the simultaneous activation of the output transfer magnets and the output armature magnets, the rotational energy from the input shaft is transferred to the output shaft.

The transfer drum must be structurally capable of enduring the imposed forces, including particularly the tangential sheer force 91 imposed by the belt on the transfer drum through the drum sprocket and the opposing sheer force imposed on the transfer drum by interaction with the output armature. Also, the transfer drum inboard end 93 and the transfer drum outboard end 95 of each transfer drum must be adequately supported to provide for a uniform armature clearance 65 between the output armature periphery 61 and the transfer drum inside surface 63. Further, the transfer drum support must provide for the transfer drum to rotate on the output shaft independently of the output armature when the output armature is deactivated.

Figure 4:
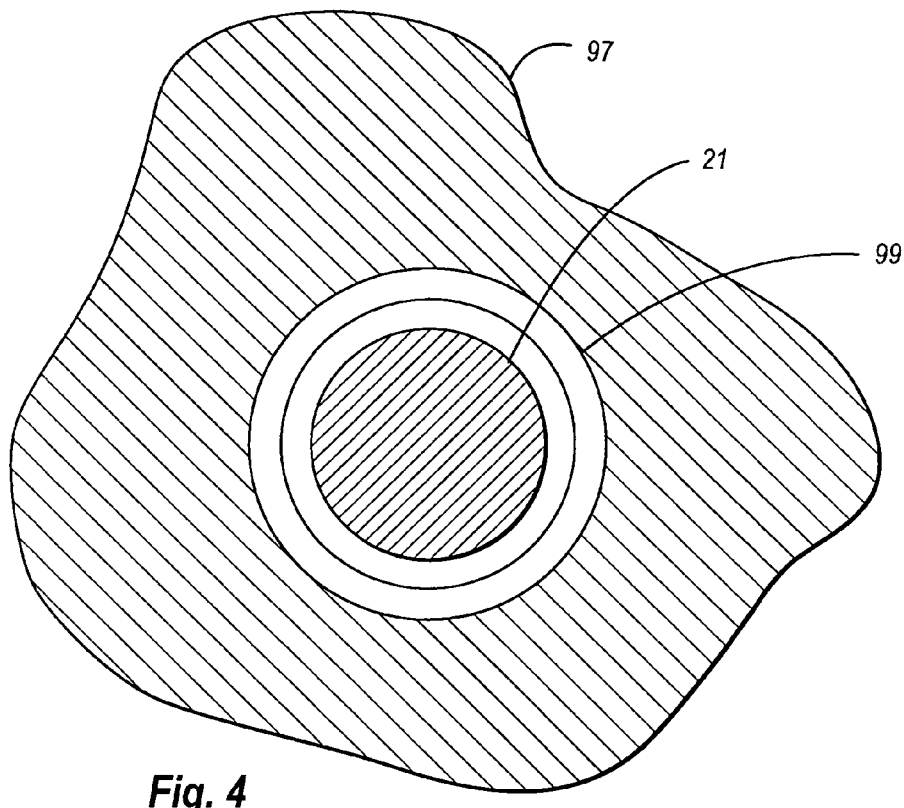
FIG. 4 is a end view cross section detail of a transfer drum end wall and transfer drum bearing.
Figure 5:
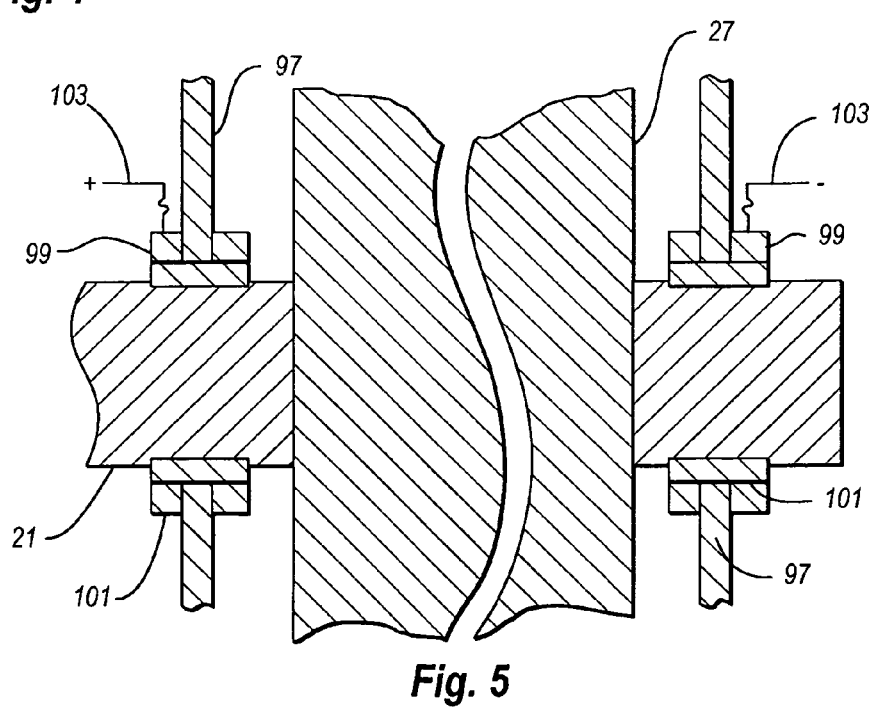
FIG. 5 is a longitudinal cross section detail of transfer drum end walls and transfer drum bearings for an output armature.

Referring to FIG. 4, a transfer drum end wall 97 is shown. The inboard end and outboard end respectively of the transfer drum may be connected to a transfer drum end wall which is rotatably attached to the output shaft by a transfer drum bearing 99. The bearings provide for the free rotation of the transfer drum. Referring also to FIG. 5, if the transfer drum end walls are to be used to provide power 103 to the output transfer magnets, a transfer bearing insulator 101 can be used to electrically insulate the end walls from the output shaft. Other embodiments may utilize other transfer drum support means known to persons skilled in the art, such as a pair of support sprockets or other transfer drum support members, to support the transfer drum from the transfer drum bearings.

The embodiment of the gear assembly 141 shown in FIGS. 1-2 incorporates a single input sprocket, a single drum sprocket and a single transfer belt. However, more than one set of input sprockets, drum sprockets and transfer belts can be utilized for a gear assembly, if desired in order to distribute and reduce the stresses imposed on the input shaft, the input sprocket, the transfer belt, the drum sprocket and the transfer drum.

A preferred embodiment of the magnetic transmission of the present invention includes an electronic gear assembly actuator for the selection and actuation of a desired gear assembly. The gear assembly with the desired speed or gear ratio is selected manually by the user or is selected automatically, the output armature magnets and the output transfer magnets for the selected gear assembly are activated, and any previously activated gear assembly is deactivated. The electronic actuator, by ramping up the electrification of a selected gear assembly and ramping down the electrification of a deselected gear assembly, can also provide for spin up of the selected gear or speed and spin down of the de-selected speed or gear, thereby providing for smooth shifting. Other gear assembly actuation means will be known to persons skilled in the art.

Figure 6:
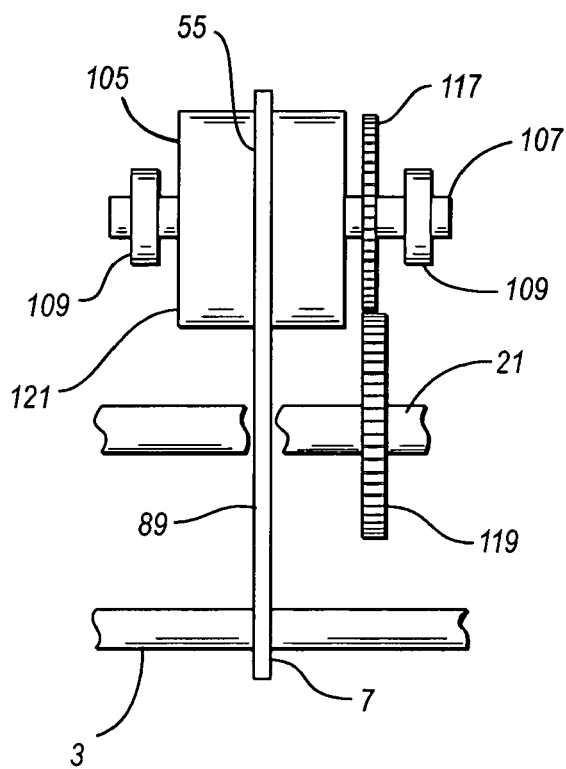
FIG. 6 is a plan view of a preferred embodiment of an optional reverse gear assembly.

Referring now to FIG. 6, a detail of a preferred embodiment of a reverse assembly 121 is shown. A reverse armature 105 is affixed to a separate reverse shaft 107 which is secured by a pair of reverse shaft bearings 109. Like the other output armatures, the reverse armature is engaged by a transfer drum. A reverse shaft gear 117 and an output shaft reverse gear 119 provide for the reverse rotation of the output shaft. Other reverse gear means will be known to persons skilled in the art.

Figure 7:
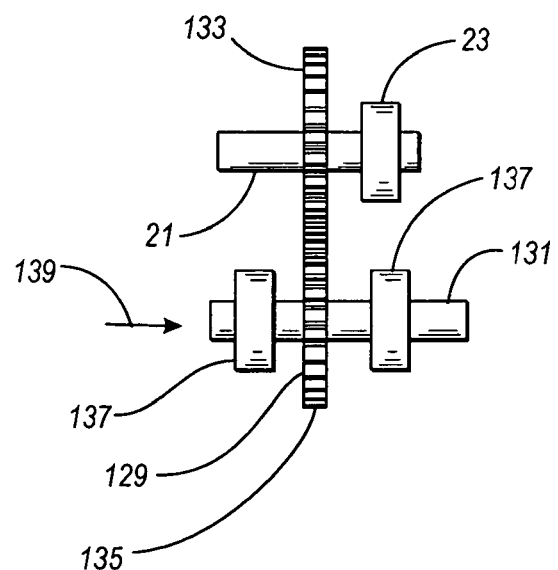
FIG. 7 is a plan view of a preferred embodiment of an optional alignment gear assembly.

Referring to FIG. 7, an alignment assembly 129 comprised of a first offset gear 133 affixed to the output shaft 21, a second offset gear 135 affixed to an offset shaft 131, and a pair of offset bearings 137, the alignment assembly providing for aligning the offset shaft axis 139 with the input shaft axis 33 for power takeoff.

Figure 8:
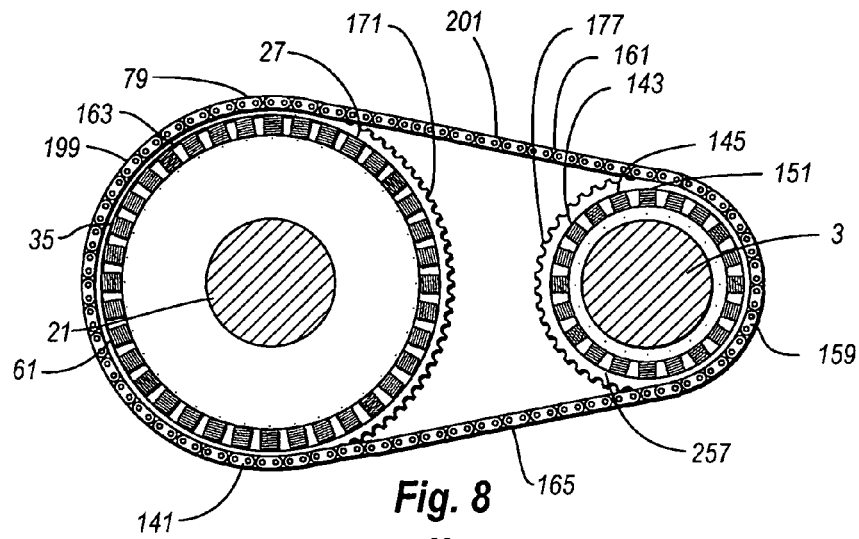
FIG. 8 is an end view cross section of a preferred embodiment of a gear assembly of the magnetic transmission of the present invention utilizing an input armature and a transfer belt with magnetic elements.
Figure 9:
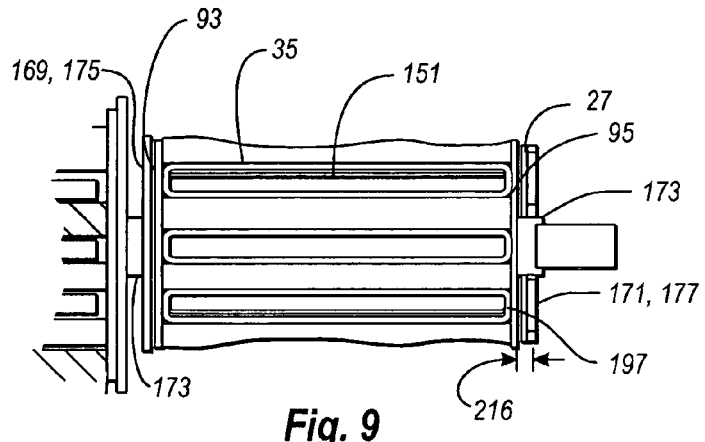
FIG. 9 is a plan view of an output armature and transfer belt sprockets of a preferred embodiment utilizing transfer belts with magnetic elements.
Figure 10:
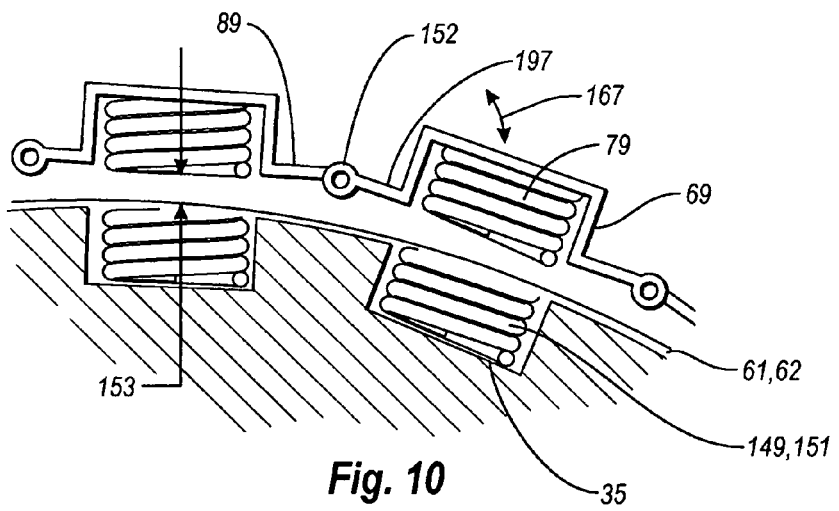
FIG. 10 is an end view cross section detail of an armature and transfer belt with opposing electromagnets.
Figure 11:
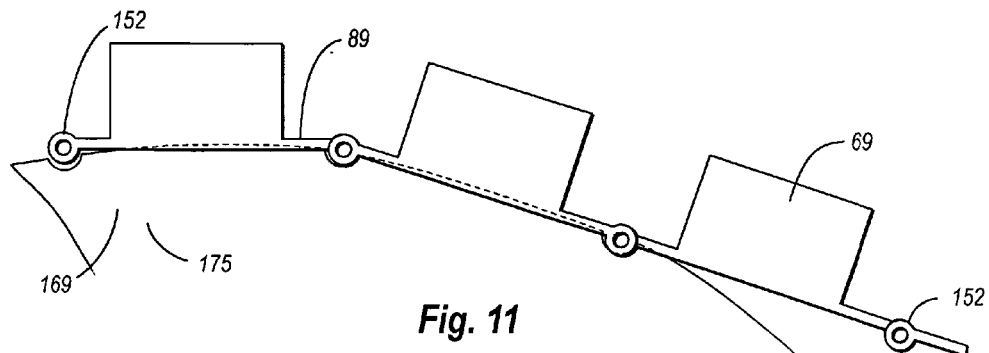
FIG. 11 is an end view cross section detail of an alternative embodiment of a transfer belt with magnetic elements and a transfer belt sprocket or an input sprocket.

Referring to FIG. 8, an alternative embodiment of the gear assembly 141 of FIG. 2 is shown. For this embodiment, the gear assembly 141 for each gear includes an input armature 143 having a plurality of input magnetic insets 145 such as that shown for the output armature of FIG. 2. Each input magnetic inset has an input armature magnet 151, which can be a permanent magnet or an electromagnet, as discussed for the output armature magnets 149 of FIG. 2. The output armature 27 for this embodiment is preferably constructed the same as shown in FIG. 2 and described above. Referring also to FIG. 9 and FIG. 10, the magnetic elements 69 for this embodiment are incorporated into the transfer belt 89, and extend from the armature inboard end 93 to the armature outboard end 95. The transfer magnets are affixed in the transfer belt magnetic elements in a manner similar to that for the transfer drum magnetic elements of the FIG. 1-2 embodiment. The magnetic elements of the transfer belt are rotatably connected by pivot pins 152 which allows the radial rotation 167 of the magnetic elements of the transfer belt so that they can be positioned a uniform belt spacing 153 from the output armature periphery 61 and the input armature periphery 62 respectively as they move from an disengaged position 165 to an engaged position 163 proximal to the output armature and as they move from a disengaged position 161 to an engaged position 159 proximal to the input armature. An inboard transfer belt sprocket 169 and an outboard transfer belt sprocket 171 are each rotatably affixed to the output shaft by an output sprocket bearing 173. These bearings position the sprockets longitudinally and prevent longitudinal movement of the sprockets while allowing the sprockets to rotate freely on the output shaft. The pivot pins are preferably extended as shown in FIG. 11 to provide for them to engage the inboard transfer belt sprocket and the outboard transfer belt sprocket, these sprockets providing for maintaining uniform belt spacing when the magnetic elements are in an engaged position and allow separation of the magnetic elements from the output armature as the magnetic elements move to a disengaged position. Similarly an inboard input sprocket 175 and an outboard input sprocket 177 provide for maintaining uniform belt spacing between the transfer belt and the input armature periphery 62 for the input armature. Each of these sprockets is connected to the input shaft by an input sprocket bearing which positions the sprocket longitudinally and prevents longitudinal movement of the sprocket while allowing the sprocket to rotate freely on the input shaft.

A further alternative embodiment of the gear assembly similar to that shown in FIG. 8 incorporates an inboard input sprocket and an outboard input sprocket which are rigidly attached to the input shaft, thereby eliminating the need for the input armatures. For that embodiment, the transfer belt is magnetically engaged only to the output armature when the gear assembly is selected and activated. When the gear assembly is not activated the transfer belt runs continually with the input shaft as for the embodiment of FIGS. 1-2 with no energy transfer to the output armature occurring.

The inboard transfer belt sprocket, the outboard transfer belt sprocket, the inboard input sprocket and the outboard input sprocket are separated from the respective armature by an armature sprocket spacing 216. Each of these sprockets is generally of circular shape and project radially from the shaft to which they are rotatably attached.

For the embodiment shown in FIGS. 8-10, the input armature magnets, the output armature magnets, and the transfer belt magnets are activated for a selected gear for the input armature magnets, the output armature magnets, and the transfer belt magnets that are in an engaged position for the selected gear. Activation of a selected gear magnetically locks the transfer belt to the input armature and the output armature and deactivation results in the free rotation of the transfer belt, independent of the output armature and the input armature.

Figure 12:
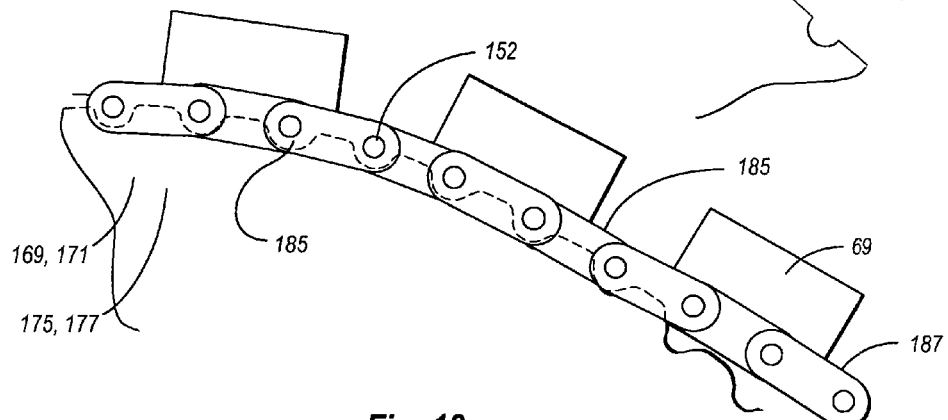
FIG. 12 is an end view cross section detail of an alternative embodiment of a transfer belt which is a transfer chain and a transfer belt sprocket or an input sprocket.

Referring to FIG. 12, an alternative sprocket engagement means 185 is shown which provides for the pivot pins 152 to be extended and incorporated in a sprocket chain 187 which is engaged by the inboard and outboard input sprockets 175, 177 and by the inboard and outboard output sprockets 169, 171.

Figure 13:
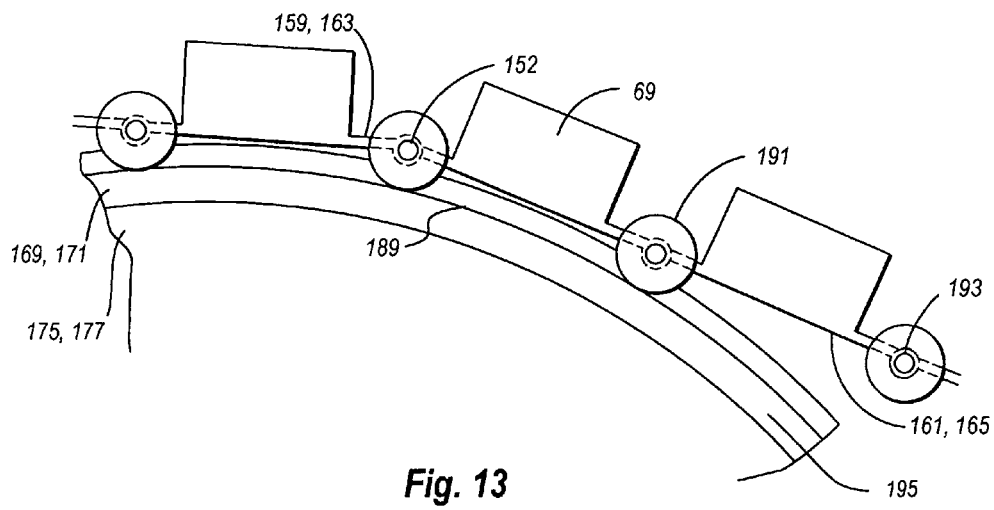
FIG. 13 is an end view cross section detail of an alternative embodiment of a transfer belt with rollers and a transfer belt support means comprising a roller guide.
Figure 16:
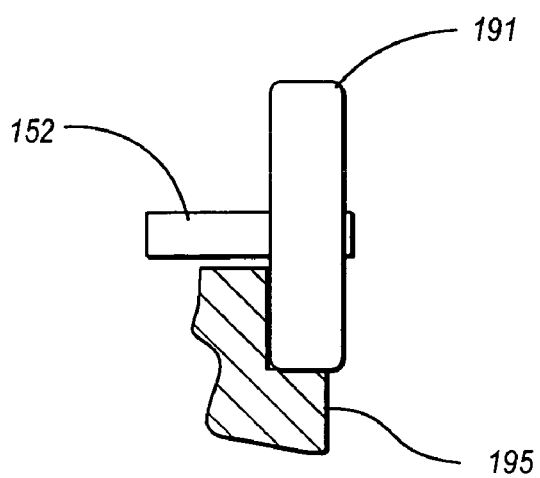
FIG. 16 is a cross section detail of a roller and roller guide of an alternative transfer belt support means.

Referring to FIG. 13 and FIG. 16, an alternative transfer belt support means 189 is shown which comprises pivot pins rollers 191 affixed at the respective pivot pin outside ends 193 and a roller guide 195 which maintains uniform belt spacing for the magnetic elements in an engaged position 159, 163 and allows separation of the magnetic elements as they move to a disengaged position 161, 165.

Referring to FIG. 9, the pivot pins can extend the full length of the magnetic elements or can simply be used to link together the end plates 197 of the magnetic elements.

Figure 14:
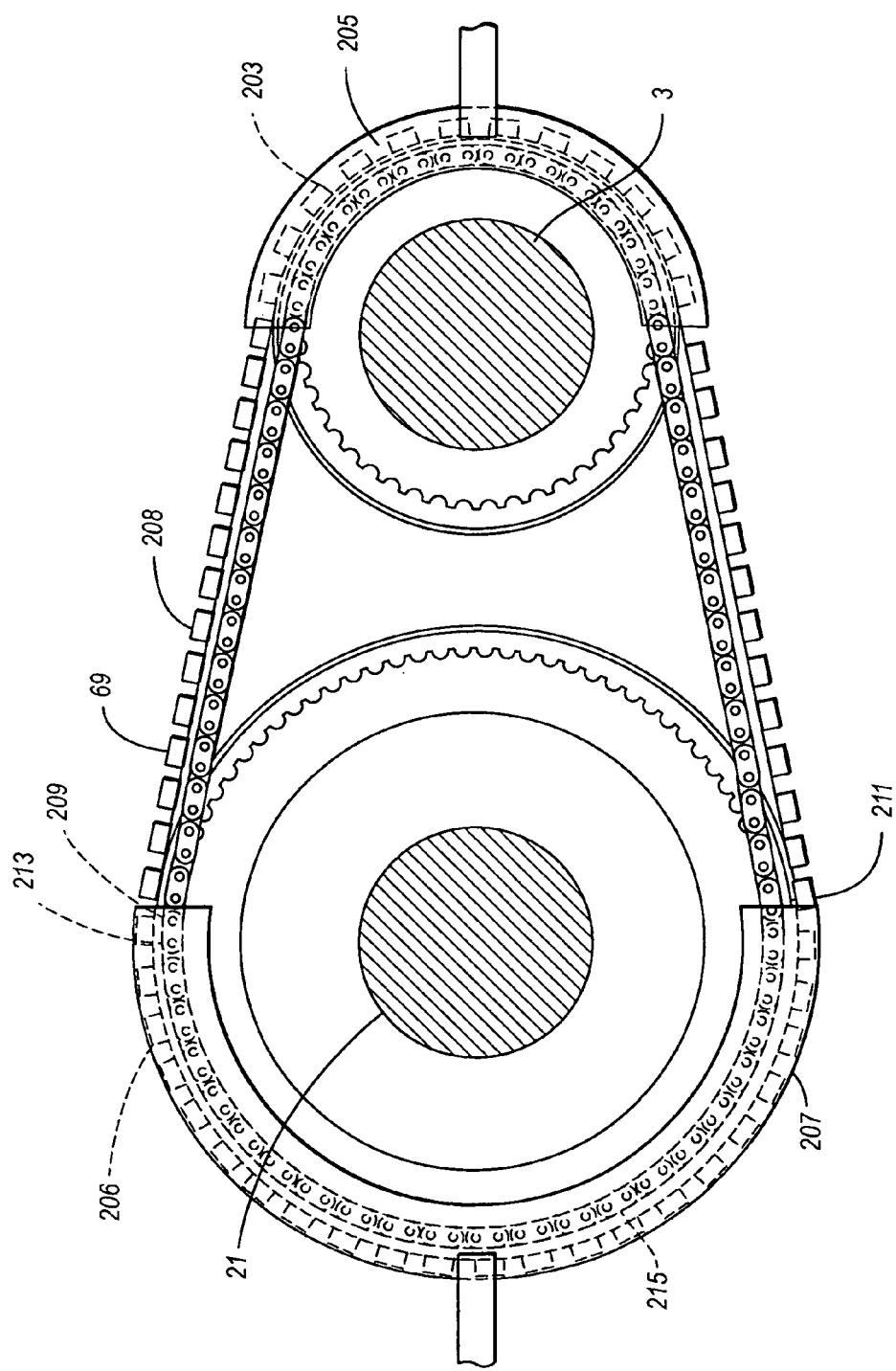
FIG. 14 is an end view cross section of a preferred embodiment of a gear assembly of the present invention utilizing an input armature and a transfer belt with magnetic elements and utilizing output brushes and input brushes to activate and de-activate the gear assembly.

For the embodiments shown in FIGS. 8-14, the magnetic elements must be disengaged from the armature, which is facilitated by de-energizing electromagnetic transfer magnets of the magnetic elements and requires the flexing of the transfer belt as the magnetic element moves between a transfer belt radial configuration 199 and a transfer belt straight configuration 201. Referring to FIG. 14, a preferred activation means 203 for a selected gear assembly incorporates a pair of input brushes 205 and a pair of output brushes 207 which contact the outside ends of the pivot pins for the magnetic elements that are in an engaged position 206 and do not contact the pivot pins of the magnetic elements in a disengaged position 208. The electromagnetic transfer magnets of each magnetic element must be energized as the magnetic element reaches an engagement position 209 as it approaches the output armature and must be de-energized at the time of or prior to the magnetic element reaching the disengagement position 211 before it begins to diverge from the output armature. The brushes remain in contact with power points 213 for each magnetic element while the magnetic element remains in the engagement zone 215 between the engagement position and the disengagement position. For the embodiment shown in FIG. 14, the pivot pins are the power points and so long as the pivot pins remain in contact with the brush, the transfer magnets of the magnetic element remain energized. As the magnetic element rotates to the dis-engagement position 211, the brush terminates and the power point loses contact with the brush, thereby de-energizing the electromagnetic transfer magnets of the magnetic element. Of course the brush for the armature in question, is not energized and does not provide power to any of the transfer magnets of the transfer belt except when the gear assembly has been selected and activated.

An alternative activation means may utilize the inboard and outboard sprockets to provide power respectively to the input armature magnets, the input transfer magnets, the output armature magnets and the output transfer magnets. For these alternatives, bearings similar to that shown in FIG. 5 can be used to electrically isolate and energize the sprockets, thereby energizing the magnetic elements for which the pivot pins are in contact with the sprockets and de-energizing the magnetic elements as they are separated from the sprockets. For the alternative shown in FIG. 13, power can be supplied to the engaged magnetic elements by contact of the rollers 191 with the roller guides 195. Other actuation means will be known to persons skilled in the art.

For the embodiments shown in FIGS. 8-14 the magnetic elements can be energized and de-energized in a controlled sequence, to promote smoothness of changing gears or speeds. The power to the transfer magnets of some or all of the engaged magnetic elements can be ramped up and ramped down in order to provide a more smooth change of speeds or gears. To provide for smoothness of shifting gears, the transfer magnets of the selected gear assembly can be energized or ramped up over a selected time period, while the de-selected gear assembly is de-energized or ramped down over a selected time period. Other shifting control means will be known to persons skilled in the art for providing a more smooth change of speeds or gears.

Another embodiment variation for the embodiments shown in FIGS. 8-14 can provide for the armature sprockets for each output armature be freely rotating upon the output shaft but for the pair of input sprockets for each speed or gear be fixed to the input shaft therefore requiring only magnetic engagement of the transfer belt and the output armature for the transfer of energy from the input shaft to the output shaft. The diameter of the input sprockets, the input shaft or the input armatures can be varied as these are desired to achieve the desired gear ratio in conjunction with the output armature that should be used.

For the embodiments shown in FIGS. 8-14, the input sprockets, the armature sprockets and components of the transfer belts must be designed to withstand the stress imposed on the input sprockets, the transfer belts, and the armature sprockets by the transfer of energy from the input shaft to the output shaft.

Figure 15:
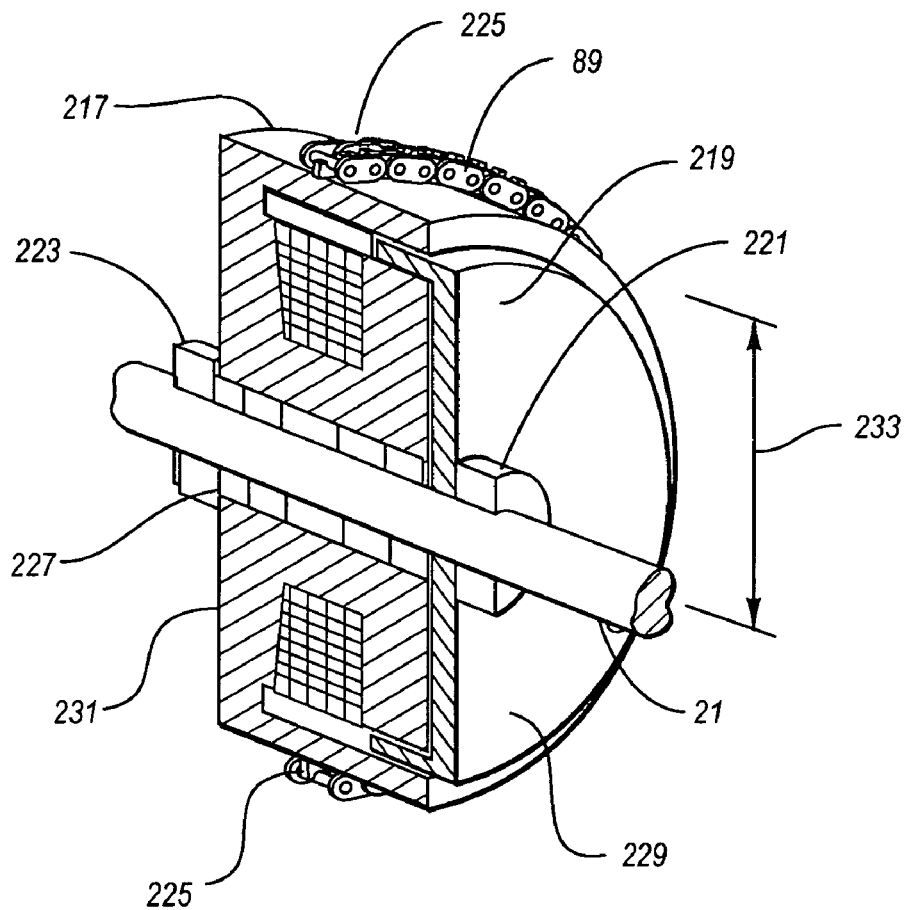
FIG. 15 is a perspective cross section detail of a gear assembly output component utilizing a hysteresis clutch with a case sprocket.

Referring now to FIG. 15, an alternative preferred embodiment of a gear assembly output component 229 of a gear assembly using a hysteresis clutch 231, such as that manufactured by Magtrol®, is shown. The hysteresis clutch is comprised of a case assembly 217, a rotor 219, case bearings 227, case hub 223, rotor hub 221. The hysteresis clutch can be alternatively energized or de-energized. A clutch sprocket 225, which extends around the exterior perimeter of the case assembly, engages the transfer belt 89 which is also engaged by an input sprocket 7 as shown for the embodiment of FIG. 1 and FIG. 2. The rotor is fixed to the output shaft while the case assembly rotates freely on the output shaft. The size of the hysteresis clutch, particularly the radius of the case assembly 233, can be selected to obtain the desired gear ratio. The hysteresis clutch can be alternatively energized and de-energized. When the clutch is de-energized, the rotor spins freely in the case assembly and no energy is transmitted from the input shaft to the output shaft 21. When the clutch is energized, the rotor and the case assembly rotate together, thereby transmitting rotational energy from the input shaft to the output shaft.

Various embodiments of transfer belts, which, as noted above, are defined for purposes herein to include various embodiments of belts and chains known to persons skilled in the art, can be used to transfer energy from the input shaft to the output shaft. Also various embodiments of input transfer belt engagement means known to persons skilled in the art, such as a sprocket, can be used to transfer energy from an input shaft, an input transfer drum, or an input hysteresis clutch. Likewise, various embodiments of output transfer belt engagement means known to persons skilled in the art, such as a sprocket, can be used to transfer energy from a transfer belt to a transfer drum, an output armature, or an output hysteresis clutch and thereby transfer energy to the output shaft.

It will be obvious to person of ordinary skill in the art that each of the embodiments of the gear assembly and the magnetic transmission shown in the drawings and described in the foregoing description and in the claims could be reversed as to the input shaft and the output shaft. For example, referring to FIG. 1, FIG. 2, and FIG. 8, embodiments identical in all respects except that for the exchange of the input shaft and the output shaft are equally feasible with the embodiments shown in these drawings. For the sake of brevity and simplicity for most of the claims, the terms "input shaft" and "output shaft" have been used, but, for the following claims and the foregoing description the terms "input shaft" and "output shaft" shall be deemed to be interchangeable. Whether the components are assembled as shown or the input and the output shaft are reversed for one or all of the gear assemblies for the magnetic transmission of the present invention will usually depend on the gear ratio desired for the gear assembly. While for most applications the shaft speed of the energy source, such as an automobile engine or an electric motor, will exceed the desired shaft speed for the energy use, such as an automobile drive train, that is not universally the case. For certain applications it may be advantageous for all or some of gear assemblies to be reversed. The terms "first shaft", "second shaft", "first sprocket", and "second sprocket" where used in the following claims are used without regard to which shaft is an "input" shaft and which shaft is an "output" shaft, the shafts being interchangeable as to which receives rotational energy and which delivers rotational energy.

Other objects, features and advantages of the present invention will become apparent from the preceding detailed description considered in connection with the accompanying drawings. It is to be understood, however, that the drawings and the foregoing description are designed as an illustration only and not as a definition of the limits of the invention. Therefore, the foregoing is intended to be merely illustrative of the invention and the invention is limited only by the following claims and the doctrine of equivalents.

What is claimed is:

1. Magnetic transmission comprising:
   a) input shaft having an input central axis;
   b) output shaft having an output central axis;
   c) plurality of generally cylindrical output armatures affixed to the output shaft, the output armatures having a longitudinal armature axis, each armature axis being aligned with the output central axis, the output armatures being generally concentric with the output shaft, each output armature having an output armature periphery which is generally concentric with the output shaft, each output armature having a plurality of generally longitudinal magnetic insets, each magnetic inset being inset from the output armature periphery, each magnetic inset containing an output armature magnet affixed in the magnetic inset;
   d) plurality of transfer drums, each transfer drum having a drum axis, each transfer drum having one or more transfer drum support members rotatably attached to the output shaft by a respective transfer drum bearing, each transfer drum having an inside circumferential drum surface, the transfer drum support members aligning the drum axis with the output central axis and spacing the inside circumferential drum surface from the output armature periphery of a respective output armature by a desired armature clearance, each transfer drum having a plurality of generally longitudinal magnetic elements, each magnetic element being inset from the transfer drum inside circumferential drum surface, each magnetic element containing an output transfer magnet affixed in the magnetic element;
   e) plurality of transfer belts, one or more transfer belts for each transfer drum;
   f) input transfer belt engagement means for each transfer belt for engaging the transfer belt by the input shaft and transferring energy from the input shaft to the transfer belt;
   g) output transfer belt engagement means for each transfer belt for engaging a selected transfer drum by the transfer belt and transferring energy from the transfer belt to the selected transfer drum; and
   h) gear assembly actuation means for selecting a desired output armature and a corresponding transfer drum and activating magnetic engagement between the selected output armature and the selected corresponding transfer drum.

2. Magnetic transmission as recited in claim 1 wherein the transfer belt is a transfer chain.

3. Magnetic transmission as recited in claim 1 wherein input transfer belt engagement means comprises an input sprocket affixed to the input shaft.

4. Magnetic transmission as recited in claim 1 wherein the transfer drum has a transfer drum periphery and wherein output transfer belt engagement means comprises an output sprocket affixed to the transfer drum periphery.

5. Magnetic transmission as recited in claim 1 wherein each output armature magnet and each output transfer magnet comprises a respective electromagnet, and wherein the gear assembly actuation means electrifies the output armature magnets of a selected armature and the output transfer magnets of a corresponding transfer drum, thereby magnetically engaging the selected armature to the corresponding transfer drum.

6. Magnetic transmission as recited in claim 1 wherein each output armature magnet and each output transfer magnet comprises a respective electromagnet, and wherein the gear assembly actuation means comprises an actuator switch for selectively electrifying the output armature magnets of the selected armature and the output transfer magnets of the corresponding selected transfer drum.

7. Magnetic transmission as recited in claim 1 wherein the gear assembly actuation means comprises a gear assembly actuator.

8. Magnetic transmission comprising:
   a) input shaft having an input central axis;
   b) output shaft having an output central axis;
   c) plurality of generally cylindrical output armatures affixed to the output shaft, the output armatures having a longitudinal armature axis, each armature axis being aligned with the output central axis, the output armatures being generally concentric with the output shaft, each output armature having an output armature periphery which is generally concentric with the output shaft, each output armature having a plurality of generally longitudinal magnetic insets, each magnetic inset being inset from the output armature periphery, each magnetic inset containing an output armature magnet affixed in the magnetic inset;
   d) plurality of transfer drums, each transfer drum having a drum axis, each transfer drum having one or more of transfer drum support members rotatably attached to the output shaft by a respective transfer drum bearing, each transfer drum having an inside circumferential drum surface, the transfer drum support members aligning the drum axis with the output central axis and spacing the inside circumferential drum surface from the output armature periphery of a respective output armature by a desired armature clearance, each transfer drum having a plurality of generally longitudinal magnetic elements, each magnetic element being inset from the transfer drum inside circumferential drum surface, each magnetic element containing a output transfer magnet affixed in the magnetic element, each transfer drum having a transfer drum periphery, each transfer drum having one or more drum sprockets affixed to the transfer drum periphery;
   e) plurality of transfer belts, one transfer belt for each drum sprocket;
   f) plurality of input sprockets affixed to the input shaft, one for each drum sprocket; and
   g) gear assembly actuator for selecting a desired output armature and a corresponding transfer drum and activating magnetic engagement between the selected output armature and the selected corresponding transfer drum.

9. Magnetic transmission as recited in claim 8 wherein the transfer belt is a transfer chain.

10. Magnetic transmission as recited in claim 8 wherein each output armature magnet and each output transfer magnet comprises a respective electromagnet, and wherein the gear assembly actuator electrifies the output armature magnets of a selected armature and the output transfer magnets of a corresponding transfer drum, thereby magnetically engaging the selected armature to the corresponding transfer drum.

11. Magnetic transmission as recited in claim 8 wherein each output armature magnet and each output transfer magnet comprises a respective electromagnet, and wherein the gear assembly actuator comprises an actuator switch for selectively electrifying the output armature magnets of the selected armature and the output transfer magnets of the corresponding selected transfer drum.

12. Magnetic transmission comprising:
   a) input shaft having an input central axis;
   b) output shaft having an output central axis;
   c) plurality of generally cylindrical output armatures affixed to the output shaft, the output armatures having a longitudinal armature axis, each armature axis being aligned with the output central axis, the output armatures being generally concentric with the output shaft, each output armature having an output armature periphery which is generally concentric with the output shaft, each output armature having a plurality of generally longitudinal magnetic insets, each magnetic inset being inset from the output armature periphery, each magnetic inset containing an output armature magnet affixed in the magnetic inset;
   d) plurality of transfer belts, each transfer belt having a transfer belt inside surface, each transfer belt having a plurality of generally longitudinal magnetic elements, each magnetic element being inset from the transfer belt inside surface, each magnetic element containing a transfer magnet affixed in the magnetic element;
   e) input transfer belt engagement means for engaging each transfer belt respectively by the input shaft and for the transfer of energy from the input shaft to each transfer belt respectively;
   f) output transfer belt support means for supporting the transfer belt about the output shaft and proximal to the output armature periphery of the corresponding output armature and maintaining a minimum belt spacing between the inside transfer belt surface and the output armature periphery; and
   g) gear assembly actuation means for selecting a desired output armature and a corresponding transfer belt and activating magnetic engagement between the selected output armature and the selected corresponding transfer belt.

13. Magnetic transmission as recited in claim 12 wherein the input transfer belt engagement means comprises a pair of input transfer belt sprockets for each transfer belt, each input transfer belt sprocket being rigidly affixed to the input shaft.

14. Magnetic transmission as recited in claim 12 wherein the input transfer belt engagement means comprises a plurality of generally cylindrical input armatures affixed to the input shaft, each input armature having a longitudinal input armature axis, each input armature axis being aligned with the input central axis, the input armatures being concentric with the input shaft, each input armature having an input armature periphery which is concentric with the input shaft, each input armature having a plurality of generally longitudinal input magnetic insets, each input magnetic inset being inset from the input armature periphery, each input magnetic inset containing an input armature magnet affixed in the input magnetic inset and wherein the input transfer belt engagement means further comprises a pair of input transfer belt sprockets for each transfer belt, each input transfer belt sprocket being rotatably attached to the input shaft by an input sprocket bearing.

15. Magnetic transmission as recited in claim 12 wherein the output transfer belt support means comprises a pair of output transfer belt sprockets for each transfer belt, each output transfer belt sprocket being rotatably attached to the output shaft by a respective output sprocket bearing, the output transfer belt sprockets maintaining a minimum belt spacing between the transfer belt inside surface and the output armature periphery of a corresponding output armature.

16. Magnetic transmission as recited in claim 12 wherein the transfer belt is a transfer chain.

17. Magnetic transmission as recited in claim 12 wherein each output armature magnet and each transfer magnet comprises a respective electromagnet, and wherein the gear assembly actuator electrifies the output armature magnets of a selected armature and the transfer magnets of a corresponding selected transfer belt, thereby magnetically engaging the selected armature to the corresponding transfer belt.

18. Magnetic transmission as recited in claim 12 wherein each output armature magnet and each transfer magnet comprises a respective electromagnet, and wherein the gear assembly actuation means comprises an actuator switch for selectively electrifying the output armature magnets of a selected armature and the transfer magnets of a corresponding selected transfer belt for magnetically engaging the selected armature to the corresponding selected transfer belt.

19. Magnetic transmission as recited in claim 12 wherein the gear assembly actuation means comprises a gear assembly actuator.

20. Magnetic transmission as recited in claim 12 wherein the gear assembly actuation means incorporates one or more output brushes.

21. Magnetic transmission comprising:
a) input shaft having an input central axis;
b) output shaft having an output central axis;
c) plurality of generally cylindrical output armatures affixed to the output shaft, the output armatures having a longitudinal armature axis, each armature axis being aligned with the output central axis, the output armatures being generally concentric with the output shaft, each output armature having an output armature periphery which is generally concentric with the output shaft, each output armature having a plurality of generally longitudinal magnetic insets, each magnetic inset being inset from the output armature periphery, each magnetic inset containing an output armature magnet affixed in the magnetic inset;
d) plurality of transfer belts, each transfer belt having a transfer belt inside surface, each transfer belt having a plurality of generally longitudinal magnetic elements, each magnetic element being inset from the transfer belt inside surface, each magnetic element containing a transfer magnet affixed in the magnetic element;
e) pair of input transfer belt sprockets for each transfer belt, each input transfer belt sprocket being rigidly affixed to the input shaft;
f) pair of output transfer belt sprockets for each transfer belt, each output transfer belt sprocket being rotatably attached to the output shaft by a respective output sprocket bearing, the output transfer belt sprockets maintaining a minimum belt spacing between the transfer belt inside surface and the output armature periphery of a corresponding output armature; and
g) gear assembly actuator for selecting a desired output armature and a corresponding transfer belt and activating magnetic engagement between the selected output armature and the selected corresponding transfer belt.

22. Magnetic transmission as recited in claim 21 wherein the transfer belt is a transfer chain.

23. Magnetic transmission as recited in claim 21 wherein each output armature magnet and each transfer magnet comprises a respective electromagnet, and wherein the gear assembly actuator electrifies the output armature magnets of a selected armature and the transfer magnets of a corresponding selected transfer belt, thereby magnetically engaging the selected armature to the corresponding transfer belt.

24. Magnetic transmission as recited in claim 21 wherein the gear assembly actuator incorporates one or more output brushes.

25. Magnetic transmission comprising:
a) input shaft having an input central axis;
b) output shaft having an output central axis;
c) plurality of hysteresis clutches affixed to the output shaft, the hysteresis clutches having a longitudinal clutch axis, each clutch axis being aligned with the output central axis, the output hysteresis clutches being concentric with the output shaft, each hysteresis clutch having a clutch periphery which is concentric with the output shaft;
d) plurality of transfer belts, one or more transfer belts for each hysteresis clutch;
e) input transfer belt engagement means for each transfer belt for engaging the transfer belt by the input shaft and transferring energy from the input shaft to the transfer belt;
f) output transfer belt engagement means for each transfer belt for engaging one of the hysteresis clutches by the transfer belt and transferring energy from the transfer belt to the hysteresis clutch; and
g) hysteresis clutch engagement means for magnetically engaging the selected hysteresis clutch to the output shaft, thereby transmitting energy from the transfer belt to the output shaft.

26. Magnetic transmission as recited in claim 25 wherein the transfer belt is a transfer chain.

27. Magnetic transmission as recited in claim 25 wherein input transfer belt engagement means comprises an input sprocket affixed to the input shaft.

28. Magnetic transmission as recited in claim 25 wherein output transfer belt engagement means comprises an output sprocket affixed to the clutch periphery.

29. Magnetic transmission as recited in claim 25 wherein the hysteresis clutch engagement means comprises an actuator switch for electrifying a selected hysteresis clutch thereby magnetically engaging the selected hysteresis clutch to the output shaft.

30. Magnetic transmission comprising:
a) input shaft having an input central axis;
b) output shaft having an output central axis;
c) plurality of hysteresis clutches affixed to the output shaft, the hysteresis clutches having a longitudinal clutch axis, each clutch axis being aligned with the output central axis, the output hysteresis clutches being concentric with the output shaft, each hysteresis clutch having a clutch periphery which is concentric with the output shaft;
d) plurality of transfer belts, one or more transfer belts for each hysteresis clutch;

e) plurality of input sprockets, one input sprocket for each transfer belt affixed to the input shaft;

f) plurality of output sprockets, one output sprocket for each transfer belt, each output sprocket being affixed to the hysteresis clutch periphery of one of the hysteresis clutches; and g) hysteresis clutch actuator for magnetically engaging the selected hysteresis clutch to the output shaft, thereby transmitting energy from the transfer belt to the output shaft.

31. Magnetic transmission as recited in claim 30 wherein the transfer belt is a transfer chain.

32. Magnetic transmission as recited in claim 30 wherein the hysteresis clutch engagement means comprises an actuator switch for electrifying a selected hysteresis clutch thereby magnetically engaging the selected hysteresis clutch to the output shaft.

33. Magnetic transmission comprising:

a) input shaft having an input central axis;

b) output shaft having an output central axis;

c) plurality of generally cylindrical output armatures affixed to the output shaft, the output armatures having a longitudinal armature axis, each armature axis being aligned with the output central axis, the output armatures being concentric with the output shaft, each output armature having an output armature periphery which is generally concentric with the output shaft, each output armature having a plurality of generally longitudinal magnetic insets, each magnetic inset being inset from the output armature periphery, each magnetic inset containing an electromagnetic armature magnet affixed in the magnetic inset;

d) plurality of transfer drums, each transfer drum having a drum axis, each transfer drum having one or more of transfer drum support members rotatably attached to the output shaft by a respective transfer drum bearing, each transfer drum having an inside circumferential drum surface, the transfer drum support members aligning the drum axis with the output central axis and spacing the inside circumferential drum surface from the output armature periphery of a corresponding output armature by a desired armature clearance, each transfer drum having a plurality of generally longitudinal magnetic elements, each magnetic element being inset from the transfer drum inside circumferential drum surface, each magnetic element containing an electromagnetic transfer magnet affixed in the magnetic element;

e) plurality of transfer belts, one or more transfer belts for each transfer drum;

f) plurality of input sprockets, one input sprocket affixed to the input shaft for each transfer belt;

g) plurality of output sprockets, one output sprocket for each transfer belt affixed to the transfer drum periphery of one of the transfer drums; and h) gear assembly actuator for selectively electrifying the electromagnetic armature magnets of a selected output armature and the electromagnetic transfer magnets of a corresponding selected transfer drum.

34. Magnetic transmission comprising:

a) input shaft having an input central axis;

b) output shaft having an output central axis;

c) plurality of generally cylindrical output armatures affixed to the output shaft, the output armatures having a longitudinal armature axis, each armature axis being aligned with the output central axis, the output armatures being generally concentric with the output shaft, each output armature having an output armature periphery which is generally concentric with the output shaft, each output armature having a plurality of generally longitudinal magnetic insets, each magnetic inset being inset from the output armature periphery, each magnetic inset containing an electromagnetic output armature magnet affixed in the magnetic inset;

d) plurality of transfer belts, each transfer belt having a transfer belt inside surface, each transfer belt having a plurality of generally longitudinal magnetic elements, each magnetic element being inset from the transfer belt inside surface, each magnetic element containing an electromagnetic transfer magnet affixed in the magnetic element;

e) pair of input sprockets for each transfer belt, each input sprocket being rigidly affixed to the input shaft;

f) pair of output belt sprockets for each transfer belt, each output belt sprocket being rotatably attached to the output shaft by a respective output sprocket bearing, the output sprockets maintaining a minimum belt spacing between the transfer belt inside surface and the output armature periphery of an output armature; and g) gear assembly actuator for selectively electrifying the electromagnetic armature magnets of a selected armature and the electromagnetic transfer magnets of a corresponding selected transfer belt.

35. Magnetic transmission comprising:

a) input shaft having an input central axis;

b) output shaft having an output central axis;

c) plurality of hysteresis clutches affixed to the output shaft, the hysteresis clutches having a longitudinal clutch axis, each clutch axis being aligned with the output central axis, the output hysteresis clutches being concentric with the output shaft, each hysteresis clutch having a clutch periphery which is concentric with the output shaft;

d) plurality of transfer belts, one or more transfer belts for each hysteresis clutch;

e) plurality of input sprockets, one input sprocket for each transfer belt affixed to the input shaft;

f) plurality of output sprockets, one output sprocket for each transfer belt, each output sprocket being affixed to the hysteresis clutch periphery of one of the hysteresis clutches; and g) gear assembly actuator for selecting and electrifying one of the hysteresis clutches.

36. Magnetic transmission gear assembly comprising:

a) first shaft having a first central axis;

b) second shaft having a second central axis;

c) generally cylindrical armature affixed to the second shaft, the armature having a longitudinal armature axis, the armature axis being aligned with the second central axis, the armature being concentric with the second shaft, the armature having an armature periphery which is generally concentric with the second central axis, the armature having a plurality of generally longitudinal magnetic insets, each magnetic inset being inset from the armature periphery, each magnetic inset containing an electromagnetic armature magnet affixed in the magnetic inset;

d) transfer drum, the transfer drum having a drum axis, the transfer drum having one or more of transfer drum support members rotatably attached to the second shaft by a respective transfer drum bearing, the transfer drum having an inside circumferential drum surface, the transfer drum support members aligning the drum axis with the second central axis and spacing the inside circumferential drum surface from the armature periphery of the armature by a desired armature clearance, the transfer drum having a plurality of generally longitudinal magnetic elements, each magnetic element being inset from the transfer drum inside circumferential drum surface, each magnetic element containing an electromagnetic transfer magnet affixed in the magnetic element;

e) transfer belt;

f) drum sprocket affixed to the transfer drum periphery and engaging the transfer belt; and g) first shaft transfer belt engagement means for engaging the transfer belt to the first shaft.

37. Magnetic transmission gear assembly as recited in claim 36 further comprising gear assembly actuator means for electrifying and de-electrifying the electromagnetic armature magnets and the electromagnetic transfer magnets.

38. Magnetic transmission gear assembly comprising:

a) first shaft having a first central axis;

b) second shaft having a second central axis;

c) generally cylindrical armature affixed to the second shaft, the armature having a longitudinal armature axis, the armature axis being aligned with the second central axis, the armature being generally concentric with the second shaft, the armature having an armature periphery which is generally concentric with the second shaft, the armature having a plurality of generally longitudinal magnetic insets, each magnetic inset being inset from the armature periphery, each magnetic inset containing an electromagnetic armature magnet affixed in the magnetic inset;

d) transfer belt, the transfer belt having a transfer belt inside surface, the transfer belt having a plurality of generally longitudinal magnetic elements, each magnetic element being inset from the transfer belt inside surface, each magnetic element containing an electromagnetic transfer magnet affixed in the magnetic element;

e) pair of first sprockets affixed to the first shaft, each of the first sprockets engaging the transfer belt; and f) pair of second sprockets rotatably attached to the second shaft by respective second sprocket bearings, each of the second sprockets engaging the transfer belt and maintaining a minimum belt spacing between the transfer belt inside surface and the armature periphery.

39. Magnetic transmission gear assembly as recited in claim 38 further comprising gear assembly actuator means for electrifying and de-electrifying the electromagnetic armature magnets and the electromagnetic transfer magnets.

40. Magnetic transmission gear assembly comprising:

a) first shaft having a first central axis;

b) second shaft having a second central axis;

c) hysteresis clutch affixed to the second shaft, the hysteresis clutch having a longitudinal clutch axis, the clutch axis being aligned with the second central axis, the hysteresis clutch being generally concentric with the second shaft, the hysteresis clutch having a clutch periphery which is generally concentric with the second shaft;

d) transfer belt;

e) clutch sprocket affixed to the hysteresis clutch periphery and engaging the transfer belt; and f) first shaft transfer belt engagement means for engaging the transfer belt to the first shaft.

41. Magnetic transmission gear assembly as recited in claim 40 further comprising gear assembly actuator means for electrifying and de-electrifying the hysteresis clutch.

\* \* \* \* \*